United States Patent Office 3,288,870
Patented Nov. 29, 1966

3,288,870
PREPARATION OF $\Delta^{1,2}$OCTALIN
Ted Symon, Lombard, and Edwin L. De Young, Chicago, Ill., assignors to Universal Oil Products Company, Des Plaines, Ill., a corporation of Delaware
No Drawing. Filed Oct. 5, 1964, Ser. No. 401,703
8 Claims. (Cl. 260—666)

This invention relates to a process for the preparation of an unsaturated polycyclic compound. More particularly, the invention is concerned with a process for the preparation of $\Delta^{1,2}$octalin.

It has now been discovered that an unsaturated polycyclic compound can be obtained in practically quantitative yields by dehydrohalogenating a corresponding halo-substituted saturated polycyclic compound. The present invention is concerned particularly with obtaining $\Delta^{1,2}$-octalin without side products which would necessitate a purification of the reaction product before the desired compound is obtained. The product of this invention, namely, $\Delta^{1,2}$octalin, will find a wide variety of usage in the chemical industry. For example, the compound may be used as a plasticizer or as an intermediate in the preparation of other resins, or as a monoolefin in a Diels-Alder reaction with other dienic compounds, a specific example being the condensation of $\Delta^{1,2}$octalin with hexachlorocyclopentadiene, the resulting compound then being utilized as an insecticide, especially against houseflies. In addition, it is contemplated that the octalin obtained by the process of this invention may be used as an intermediate in the aroma industry as a component of perfumes, colognes, scents for aftershave lotions, soaps, detergents, etc.

It is therefore an object of this invention to provide a process for obtaining pure $\Delta^{1,2}$octalin which will not require purification before use thereof.

In a broad aspect one embodiment of this invention resides in a process for the production of $\Delta^{1,2}$octalin which comprises dehydrohalogenating a 1-halodecalin in the presence of an alcoholic alkaline substance at dehydrohalogenating conditions, and recovering the resultant $\Delta^{1,2}$octalin.

A further embodiment of this invention is found in a process for the production of $\Delta^{1,2}$octalin which comprises dehydrohalogenating 1-chlorodecalin in the presence of an alcoholic alkali metal hydroxide at a temperature in the range of from about 100° to about 200° C. and at a pressure in the range of from about atmospheric up to about 200 atmospheres, and recovering the resultant $\Delta^{1,2}$octalin.

A specific embodiment of this invention is found in a process for the production of $\Delta^{1,2}$octalin which comprises dehydrochlorinating 1-chlorodecalin in the presence of alcoholic potassium hydroxide at a temperature in the range of from about 125° to about 175° C. and at a pressure in the range of from about atmospheric up to about 200 atmospheres, and recovering the resultant $\Delta^{1,2}$octalin.

Other objects and embodiments will be found in the following further detailed description of this invention.

The starting material for the preparation of the $\Delta^{1,2}$-octalin will comprise a 1-halodecalin. In order to obtain the substantially quantitative yield of the desired product, it is necessary that the starting material comprise a pure 1-halodecalin. Commercial mixtures of cis- and trans-decalin, when halogenated by means of a halohydrocarbon such as t-butyl chloride, t-butyl bromide, etc., in the presence of a metal halide catalyst, will yield a mixture of both 1-halo- and 9-halodecalins. In order to overcome this drawback, the 1-halodecalin which is utilized as a starting material is obtained by treating pure trans-decalin with a polyhalogenated hydrocarbon in the presence of certain catalytic compositions of matter such as catalysts which are capable of forming free radicals under reaction conditions. The pure trans-decalin which is the necessary starting material can be obtained from the hydrogenation of naphthalene or tetralin in the presence of hydrogenation catalysts. In addition, it is also possible to obtain trans-decalin by treating cis-decalin with aluminum chloride whereby said cis-decalin is isomerized to trans-decalin.

The trans-decalin which is in a pure state is treated with polyhalo-substituted hydrocarbons containing from about 1 to about 6 carbon atoms or more in length. Specific examples of these compounds include trichloromethane (chloroform), tribromomethane (bromoform), triiodomethane (iodoform), trifluoromethane (fluoroform), carbon tetrachloride, carbon tetrabromide, carbon tetraiodide, carbon tetrafluoride, 1,1,1-trichloroethane, 1,1,2,2-tetrabromoethane, 1,1,33-tetraiodopropane, 1,1-difluorobutane, etc. The trans-decalin is treated with the aforementioned polyhalo-substituted hydrocarbon in the presence of catalysts which include peroxy compounds containing the bivalent —O—O— and which are capable of inducing the transfer of the halogen from the halogenated compound to the naphthenic ring. The organic peroxy compounds constitute the preferred class of catalysts and include peracetic acid, persuccinic acid, dimethyl peroxide, diethyl peroxide, dipropyl peroxide, di-t-butyl peroxide, butyryl peroxide, benzoyl peroxide, t-butyl hydroperoxide, etc.

The preparation of the 1-halodecalin is effected at elevated reaction temperatures which are at least as high as the initial decomposition temperature of the free radical generating catalyst, such as the peroxide compound, in order to liberate and form free radicals which promote the reaction. In selecting a particular reaction temperature for use, two considerations must be taken into account. First, sufficient energy by means of heat must be supplied to the reaction system so that the reactants, namely, the 1-halodecalin and the polyhalogenated hydrocarbon, will be activated sufficiently for hydrogen-halogen transfer to take place when free radicals are generated by the catalyst. Second, free radical generating catalysts such as peroxy compounds, particularly organic peroxides, decompose at a measurable rate with time in a logarithmic function dependent upon temperature. This rate of decomposition can be, and ordinarily is, expressed as the half-life of a peroxide at a particular temperature. For example, the half-life in hours for di-t-butyl peroxide is 17.5 hours at 125° C., 5.3 hours at 135° C. and 1.7 hours at 145° C. (calculated from data for the first 33% decomposition). A reaction system temperature must then be selected so that the free radical generating catalyst decomposes smoothly with the generation of free radicals at a half-life which is not too long. In other words, sufficient free radicals must be present to induce the present chain reaction to take place, and these radicals must be formed at a temperature at which the reactants are in a suitably activated state for condensation. When the half-life of the free radical generating catalyst is greater than 10 hours, radicals are not generated at a sufficient rate to cause the reaction to go forward at a detectable rate. Thus, the reaction temperature may be within the range of from about 50° to about 300° C. and at least as high as the decomposition temperature of the catalyst, by which is meant a temperature such that the half-life of the free radical generating catalyst is not greater than 10 hours. Since the half-life for each free radical generating catalyst is different at different temperatures, the exact temperature to be utilized in a particular reaction will vary. However, persons skilled in the art are well acquainted with the half-life versus temperature data for different free radical generating catalysts and, thus, it is within the skill of one familiar with the art to select the particular temperature needed for any particular catalyst. However, the operating temperatures generally do not exceed the decomposition temperatures of the catalyst by more than about 150° C. For example, when a free radical generating catalyst such as t-butyl perbenzoate is used having a decomposition temperature of approximately 115° C., the operating temperature of the process is from about 115° C. to about 265° C. When di-t-butyl peroxide having a decomposition temperature of about 130° C. is used, the process is run at a temperature ranging from about 130° to about 280° C. Higher reaction temperatures may be employed, but little advantage is gained if the temperature is more than the hereinbefore mentioned 150° C. higher than the decomposition temperature of the catalyst. In addition to the elevated temperatures which are utilized, the reaction may also be effected at elevated pressures ranging from about 1 to about 100 atmospheres or more, the preferred operating pressure of the process being that which is required to maintain a substantial portion of the reactants in liquid phase. Pressure is not an important variable in this process. However, because of the low boiling points of some of the reactants, it is necessary to utilize pressure withstanding equipment process being that which is required to maintain a substantial portion of the reactants in liquid phase. Pressure to insure liquid phase conditions. In batch type operations it is often desirable to utilize pressure-withstanding equipment, to charge the reactants and catalyst to the vessel, and to pressure the vessel with 10, 30, 50 or more atmospheres with an inert gas such as nitrogen. This helps to insure the presence of liquid phase conditions. However, when the mole quantity of reactants is sufficient, the pressure which they themselves generate at the temperature utilized is sufficient to maintain the desired phase conditions. Furthermore, the concentration of the catalyst employed in this process may vary over a rather wide range, but it is desirable to utilize low concentrations of the catalysts such as from about 0.1 to about 10% of the total weight of the combined starting materials charged to the process. The reaction time may be within the range of from less than one minute to several hours depending upon the temperature and half-life of the free radical generating catalyst. Generally speaking, contact times of at least 10 minutes are preferred.

The 1-halodecalin such as 1-chlorodecalin, 1-bromodecalin, 1-iododecalin or 1-fluorodecalin, the preferred compounds which are utilized as the starting materials in the process of this invention comprising the 1-chlorodecalin and 1-bromodecalin, are then dehydrohalogenated by treating said halodecalin at an elevated temperature in the range of from about 100° to about 200° C. and at a pressure ranging from about atmospheric up to about 200 atmospheres in the presence of an alcoholic alkaline substance. The pressure which is utilized in this invention will be dependent upon the particular halodecalin undergoing dehydrohalogenation and the particular reaction temperature which is used, the amount of pressure being that which is sufficient to maintain a major portion of the reactants in the liquid phase. The process of this invention can be illustrated by the following equation in which 1-chlorodecalin is dehydrohalogenated in the presence of alcoholic potassium hydroxide at an elevated temperature and pressure to form the desired $\Delta^{1,2}$octalin.

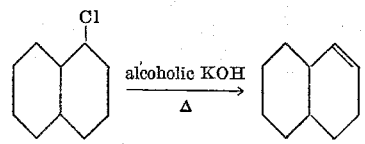

Examples of alkaline substances which may be used preferably compise the hydroxides of alkali metals such as potassium hydroxide, sodium hydroxide, lithium hydroxide etc. It is also contemplated that the hydroxides of the alkaline earth metals such as magnesium hydroxide, calcium hydroxide, strontium hydroxide, etc. may also be used, although not necessarily with equivalent results. The medium in which the alkaline substance is based may comprise methyl alcohol, ethyl alcohol, n-propyl alcohol, isopropyl alcohol, butyl alcohol, amyl alcohol, etc.

The process of the present invention may be effected in any suitable manner and may comprise either a batch or continuous type operation. For example, when a batch type operation is used, a quantity of the starting material is placed in an appropriate reaction vessel. This reaction vessel may comprise a flask, if atmospheric pressure is to be used, or a rotating autoclave, if superatmospheric pressures are to be employed. Following the introduction of the starting material into the reaction vessel and upon the addition of the alcoholic alkaline substance thereto, the 1-halodecalin is heated to the desired reaction temperature and the vessel and contents thereof are maintained at this temperature for a predetermined residence time. In the event that superatmospheric pressures are to be employed, the elevated pressure may be supplied by the introduction of a substantially inert gas such as nitrogen into the reaction vessel. Upon completion of the desired residence time the vessel and contents thereof are cooled to room temperature, the excess pressure, if any, is vented, and the reaction product recovered by conventional means.

It is also contemplated within the scope of this invention that the desired product comprising $\Delta^{1,2}$octalin may be obtained in a continuous manner of operation. When such an operation is used, the 1-halodecalin which comprises the starting material is continuously charged to a reaction vessel which is maintained at the proper operating conditions of temperature and pressure. The alcoholic alkaline substance is also continuously charged to the reaction vessel through a separate line or, if so desired, it may be admixed with the 1-halodecalin prior to entry into said reaction vessel, and the resulting mixture is then charged thereto in a single stream. Upon completion of the desired residence time the reactor effluent is continuously withdrawn and the desired product comprising $\Delta^{1,2}$octalin is separated from unreacted starting material and catalyst, the latter two being recycled to form a portion of the feed stock while the former is purified and recovered.

The following examples are given to illustrate the process of the present invention which, however, are not intended to limit the generally broad scope of the present invention in strict accordance therewith.

*Example I*

A mixture of 276 grams (2.0 moles) of transdecalin, 308 grams (2.0 moles) of carbon tetrachloride, 5 grams (0.02 mole) of benzoyl peroxide and 28 grams (0.2 mole) of potassium carbonate were placed in a flask provided with heating and refluxing means. The flask and contents thereof were then heated to reflux and maintained thereat for a period of about 20 hours. At the end of this time the flask and contents thereof were allowed to cool to room temperature, the solids were removed by filtration, the liquid was washed with water to remove any water-soluble material which may have been present and thereafter dried over anhydrous sodium sulfate. Thereafter the liquid was subjected to fractional distillation under reduced pressure and the cut which boiled in a range of front about 98° to about 101° C. at 13 mm. pressure comprising 1-chlorodecalin was separated and recovered.

A solution of 90 grams (1.6 moles) of potassium hydroxide in 500 cc. of ethyl alcohol and 208 grams (1.2 moles) of 1-chlorodecalin was sealed in a rotating autoclave and nitrogen pressed in until an initial pressure of about 50 atmospheres was reached. The autoclave and contents thereof were then heated to a temperature of about 150° C. and maintained thereat for a period of 6 hours. At the end of this time the autoclave and contents thereof were cooled to room temperature, the excess pressure was vented and the reaction product recovered. The product was separated from the potassium chloride which formed by filtration and the solvent was evaporated. The residue was distilled and the cut boiling at 56° C. at 9 mm. pressure comprising $\Delta^{1,2}$octalin was recovered. The $\Delta^{1,2}$octalin was analyzed and found to have a refractive index $N_D^{24}$ 1.4805.

*Example II*

A mixture of 276 grams (2.0 moles) of transdecalin, 664 grams (2.0 moles) of carbon tetrabromide, 5 grams (0.02 mole) of benzoyl peroxide and 28 grams (0.2 mole) of potassium carbonate is placed in a flask provided with refluxing means. The flask is heated to a temperature of about 110° C. and maintained at this temperature for a period of about 20 hours. At the end of this time the solids are removed by filtration; the liquid portion or filtrate is washed with water and dried over anhydrous sodium sulfate. Following this, the liquid is distilled under reduced pressure and the cut comprising 1-bromodecalin is separated and recovered.

A solution of 90 grams (1.6 moles) of potassium hydroxide in 500 cc. of ethyl alcohol and 260 grams (1.2 moles) of 1-bromodecalin is sealed in a rotating autoclave and nitrogen is pressed in until an initial pressure of 50 atmospheres is reached. Following this, the autoclave and contents thereof are heated to a temperature of about 150° C. and maintained thereat for a period of about 6 hours. At the end of this time the autoclave is cooled, the excess pressure is vented and the reaction mixture is recovered. The potassium bromide is removed by filtration and the alcohol solvent is evaporated. The residue is then subjected to fractional distillation under reduced pressure and the desired $\Delta^{1,2}$octalin is recovered.

*Example III*

In this example 1-chlorodecalin is prepared by treating a mixture of trans-decalin, chloroform, potassium carbonate and a catalyst comprising di-t-butyl peroxide in a manner similar to that hereinfore set forth in Example I above. Upon completion of the desired residence time, which is approximately 20 hours, the flask and contents thereof are cooled to room temperature, the mixture is filtered to remove solids following which the filtrate is washed with water and dried over anhydrous sodium sulfate. After subjecting the filtrate to fractional distillation under reduced pressure, the desired 1-chlorodecalin is separated and recovered.

The 1-chlorodecalin which is prepared according to the above paragraph is treated with a solution of sodium hydroxide in ethyl alcohol by placing the mixture in a rotating autoclave, pressing in nitrogen gas until the desired pressure is reached and thereafter heating the autoclave to a temperature of about 150° C. for a period of about 6 hours. After completion of the desired residence time the reaction mixture is recovered by allowing the autoclave to cool and venting the excess pressure before opening the autoclave. The sodium chloride is removed by filtration and the ethyl alcohol allowed to evaporate. Following this, the residue is distilled under reduced pressure and the desired $\Delta^{1,2}$octalin is recovered.

*Example IV*

In this example 1-bromodecalin is prepared by treating a mixture of trans-decalin in bromoform in the presence of t-butyl peroxide and potassium carbonate in a manner similar to that set forth in Example II above. The 1-bromodecalin which is recovered after distillation of the reaction product under reduced pressure is then treated with a solution of sodium hydroxide in ethyl alcohol. The dehydrobromination of the 1-bromodecalin is effected in a rotating autoclave at a temperature of about 150° C. and an implied pressure of 50 atmospheres of nitrogen for a period of about 6 hours. At this end of the reaction time, the resultant mixture, after removal of the sodium bromide and evaporation of the ethyl alcohol, is subjected to fractional distillation under reduced pressure, the desired $\Delta^{1,2}$octalin being separated and recovered therefrom.

We claim as our invention:

1. A process for the production of $\Delta^{1,2}$-octalin which comprises dehydrohalogenating a 1-halodecalin in the presence of an alcoholic alkaline substance at dehydrohalogenating conditions, and recovering the resultant $\Delta^{1,2}$-octalin.

2. A process for the production of $\Delta^{1,2}$octalin which comprises dehydrohalogenating a 1-halodecalin in the presence of an alcoholic alkali metal hydroxide at a temperature in the range of from about 100° to about 200° C. and at a pressure in the range of from about atmospheric up to about 200 atmospheres, and recovering the resultant $\Delta^{1,2}$octalin.

3. A process for the production of $\Delta^{1,2}$octalin which comprises dehydrohalogenating 1-chlorodecalin in the presence of an alcoholic alkali metal hydroxide at a temperature in the range of from about 100° to about 200° C. and at a pressure in the range of from about atmospheric up to about 200 atmospheres, and recovering the resultant $\Delta^{1,2}$octalin.

4. A process for the production of $\Delta^{1,2}$octalin which comprises dehydrohalogenating 1-bromodecalin in the presence of an alcoholic alkali metal hydroxide at a temperature in the range of from about 100° to about 200° C. and at a pressure in the range of from about atmospheric up to about 200 atmospheres, and recovering the resultant $\Delta^{1,2}$octalin.

5. A process for the production of $\Delta^{1,2}$octalin which comprises dehydrochlorinating 1-chlorodecalin in the presence of alcoholic potassium hydroxide at a temperature in the range of from about 125° to about 175° C. and at a pressure in the range of from about 25 up to about 50 atmospheres, and recovering the resultant $\Delta^{1,2}$octalin.

6. A process for the production of $\Delta^{1,2}$octalin which comprises dehydrochlorinating 1-chlorodecalin in the presence of alcoholic sodium hydroxide at a temperature in the range of from about 125° to about 175° C. and at a pressure in the range of from about 25 up to about 50 atmospheres, and recovering the resultant $\Delta^{1,2}$octalin.

7. A process for the production of $\Delta^{1,2}$octalin which comprises dehydrobrominating 1-bromodecalin in the presence of alcoholic potassium hydroxide at a temperature in the range of from about 125° to about 175° C. and at a pressure in the range of from about 25 up to about 50 atmospheres, and recovering the resultant $\Delta^{1,2}$ octalin.

8. A process for the production of $\Delta^{1,2}$octalin which comprises dehydrobrominating 1-bromodecalin in the presence of alcoholic sodium hydroxide at a temperature in the range of from about 125° to about 175° C. and at a pressure in the range of from about 25 up to about 50 atmospheres, and recovering the resultant $\Delta^{1,2}$octalin.

References Cited by the Examiner

K. Aswath Norain Rao et al.: J. Annamalai Univ., 7, pp. 22–6, 1937.

Robert A. Benkeser: J. American Chem. Soc., 77, pp. 3230–3, 1955.

DELBERT E. GANTZ, *Primary Examiner.*

V. O'KEEFE, *Assistant Examiner.*